United States Patent
Ip et al.

(10) Patent No.: US 10,741,992 B2
(45) Date of Patent: Aug. 11, 2020

(54) EXTENDING SYSTEM REACH OF UNREPEATED SYSTEMS USING CASCADED AMPLIFIERS

(71) Applicant: NEC Laboratories America, Inc., Princeton, NJ (US)

(72) Inventors: Ezra Ip, West Windsor, NJ (US); Yue-Kai Huang, Princeton, NJ (US); Fatih Yaman, Princeton, NJ (US); Shaoliang Zhang, Princeton, NJ (US)

(73) Assignee: NEC Corporation (JP)

( * ) Notice: Subject to any disclaimer, the term of this patent is extended or adjusted under 35 U.S.C. 154(b) by 360 days.

(21) Appl. No.: 15/724,755

(22) Filed: Oct. 4, 2017

(65) Prior Publication Data

US 2018/0102626 A1 Apr. 12, 2018

Related U.S. Application Data

(60) Provisional application No. 62/406,105, filed on Oct. 10, 2016.

(51) Int. Cl.
*H01S 3/23* (2006.01)
*H01S 3/094* (2006.01)
*H04B 10/291* (2013.01)
*H04B 10/293* (2013.01)
*H01S 3/067* (2006.01)
(Continued)

(52) U.S. Cl.
CPC ........ *H01S 3/2316* (2013.01); *H01S 3/06737* (2013.01); *H01S 3/06754* (2013.01); *H01S 3/094003* (2013.01); *H01S 3/094019* (2013.01); *H04B 10/2912* (2013.01); *H04B 10/2916* (2013.01); *H04B 10/2935* (2013.01); *H01S 3/06708* (2013.01); *H01S 3/06758* (2013.01); *H01S 3/094011* (2013.01); *H01S 3/094053* (2013.01); *H01S 3/1608* (2013.01); *H01S 3/302* (2013.01)

(58) Field of Classification Search
CPC .......... H01S 3/06737; H01S 3/094011; H01S 3/2316

See application file for complete search history.

(56) References Cited

U.S. PATENT DOCUMENTS 8,111,454 B2 * 2/2012 Chang ................ H04B 10/2916
359/341.32
2008/0152352 A1 * 6/2008 Papernyi ............ H04B 10/2918
398/157

(Continued)

OTHER PUBLICATIONS

Takara et al, "120.7-Tb/s MCF-ROPA Unrepeatered Transmission of PDM-32QAM Channels Over 204 km", Journal of Lightwave Technology, vol. 33, No. 7, Apr. 1, 2015, pp. 1473-1478 (Year: 2015).*

Takashi Mizuochi, Kaoru Kinjo, Satoshi Kajiya, Toshiyuki Tokura and Kuniaki Motoshima, "Bidirectional Unrepeatered 43 Gb/s WDM Transmission With C/L Band-Separated Raman Amplification," Journal of Lightwave Technology, vol. 20, No. 12, pp. 2079-2085, Dec. 2002.

(Continued)

*Primary Examiner* — Eric L Bolda
(74) *Attorney, Agent, or Firm* — Joseph Kolodka

(57) ABSTRACT

An unrepeatered transmission system includes a receiver coupled to a receive span; a transmitter coupled to the receive span; and a plurality of cascaded amplifiers in the receive span with dedicated fiber cores to supply one or more optical pumps from the receiver to each amplifier, wherein the plurality of cascaded amplifiers increase system reach by increasing the length of a back span in an unrepeatered link.

4 Claims, 6 Drawing Sheets

(51) Int. Cl.
*H01S 3/16* (2006.01)
*H01S 3/30* (2006.01)

(56) References Cited

U.S. PATENT DOCUMENTS

| | | | | |
|---|---|---|---|---|
| 2012/0206793 | A1* | 8/2012 | Tanaka | G02B 6/2804 359/341.3 |
| 2012/0294619 | A1* | 11/2012 | Richardson | H04B 10/2916 398/105 |
| 2013/0063809 | A1* | 3/2013 | Nishihara | H01S 3/06737 359/341.2 |
| 2015/0318661 | A1* | 11/2015 | Matsuo | G02B 6/02042 359/341.3 |
| 2016/0020573 | A1* | 1/2016 | Watanabe | G02B 6/2856 359/341.3 |
| 2016/0261349 | A1* | 9/2016 | Chang | H04B 10/564 |
| 2017/0279242 | A1* | 9/2017 | Yaman | H01S 3/094049 |

OTHER PUBLICATIONS

Tiejun J. Xia, Daniel L. Peterson, Glenn A. Wellbrock, Do-Il Chang, Philippe Perrier, Herve Fevrier, Sergey Ten, Christopher Tower, Greg Mills, "557-km Unrepeatered 100G Transmission with Commercial Raman DWDM System, Enhanced ROPA, and Cabled Large Aeff Ultra-Low Loss Fiber in OSP Environment," Optical Fiber Communications (OFC 2014), Paper Th5A.7, Los Angeles, CA, USA (2014).

Do-Il Chang, Edwin Zak, Wayne Pelouch, Philippe Perrier, Herve Fevrier, "100G unrepeatered transmission over 626.8 km with a span loss in excess of 100 dB," Asia Communications and Photonics Conference (ACP 2015), Paper AM4A.2, Hong Kong (2015).

Do-il Chang, Philippe Perrier, Herve Fevrier, Sergejs Makovejs, Christopher Towery, Xiaotie Jia, Li Deng, and Bozhong Li, "Ultra-long unrepeatered transmission over 607 km at 100G and 632 km at 10G," Opt. Exp. vol. 23, No. 19, pp. 25028-25033, Sep. 2015.

* cited by examiner

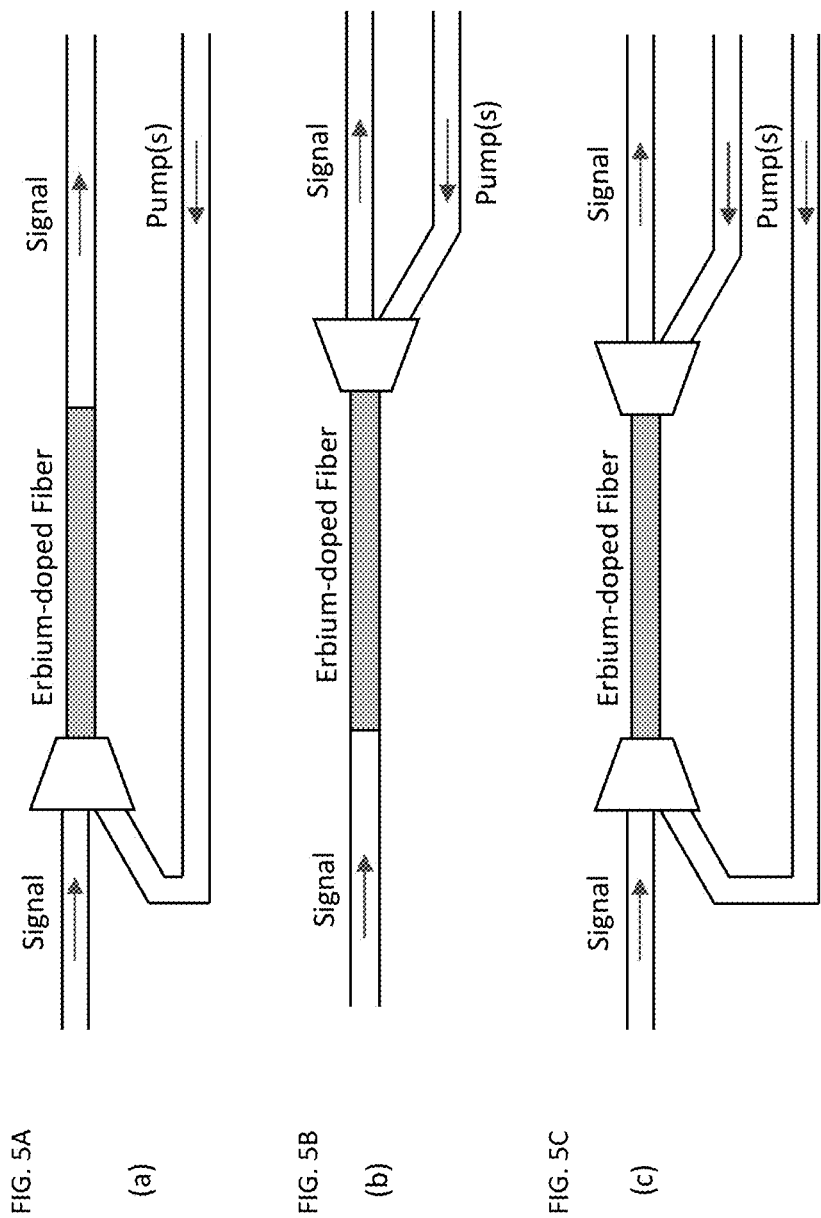

EXTENDING SYSTEM REACH OF UNREPEATED SYSTEMS USING CASCADED AMPLIFIERS

BACKGROUND

The present invention relates to optical communication techniques.

In an unrepeated system, a signal is communicated between a transmitter and a receiver without using inline optical amplifiers whose electrical power source has to be supplied either in mid-link (as in terrestrial systems), or is carried by the same cable that carries the optical signal (as in ultra-long-haul submarine systems). It is often desirable to communicate the signal over the maximum distance possible while maintaining sufficient optical signal-to-noise ratio (OSNR) for detection.

Amplification strategies for unrepeated transmission systems can use: (a) forward and backward Raman, (b) transmitter-pumped and receiver-pumped ROPAs, (c) transmitter-pumped and receiver-pumped ROPAs with dedicated fibers for pump delivery. Traditionally, forward or backward Raman amplifiers of arbitrary order have been used, as shown in FIG. 1A. In this case, optical pump(s) propagate in the same fiber core as the signal; the Raman effect causes power to be transferred from the optical pump(s) to the signal. Alternatively, it is possible to use remote optically pumped amplifiers (ROPA) (FIG. 1B). A ROPA is a lumped amplifier, typically an erbium-doped fiber (EDF). The optical pump(s) for the ROPA propagate in the same fiber core as the signal, and can be supplied from the transmitter and/or receiver. Since pump photons are only converted into signal photons at the amplifier, and not needlessly converted in a distributed manner along the transmission fiber when the signal's power is still high, a system using ROPAs can achieve longer reach than one using forward and backward Raman amplifiers. Nevertheless, some Raman power transfer between the ROPA pump and the signal is unavoidable as the ROPA pump is typically at around 1480 nm, which in presence of a signal in the C-band (~1550 nm) will result in non-negligible Raman pump efficiency. Recently, it was proposed that separate pump delivery fibers can be used to deliver the optical pump(s) to the ROPA to avoid the undesired Raman power transfer between the ROPA pump(s) and the signal (FIG. 1C).

SUMMARY

An unrepeated transmission system includes a receiver coupled to a receive span; a transmitter coupled to the receive span; and a plurality of cascaded amplifiers in the receive span with dedicated fiber cores to supply one or more optical pumps from the receiver to each amplifier, wherein the plurality of cascaded amplifiers increase system reach by increasing the length of a back span in an unrepeatered link.

Advantages may include one or more of the following. The system provides the ability to extend transmission reach in unrepeatered systems. As mentioned in A3, cascading multiple amplifiers can potentially increase the length of the receive span by a factor of two compared with using only a single amplifier. In current systems using ROPAs where the pump counter-propagates with the signal in the same fiber core, the receive span is typically ~120-150 km long depending on the type of transmission fiber used, the modulation format of the signal, and the total number of wavelength-division multiplexed (WDM) channels transmitted. When a dedicated fiber is used to supply a single ROPA pump, the receive span can be increased to around 150-180 km. The use of multiple ROPAs should conservatively enable the length of the receive span to increase another 50%, which is an improvement of around 80 km.

BRIEF DESCRIPTION OF THE DRAWINGS

FIGS. 5A-5C show exemplary system configurations where each cascaded amplifier is a ROPA, and multiple single-mode fibers are used to deliver the pumps from the receiver.

DESCRIPTION

Figure 1A:
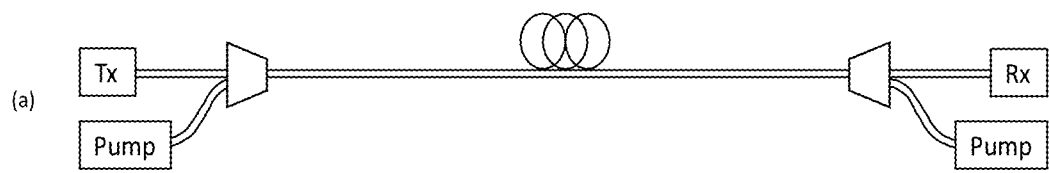
FIGS. 1A-1C show exemplary amplification strategies for unrepeatered transmission systems.
Figure 1B:
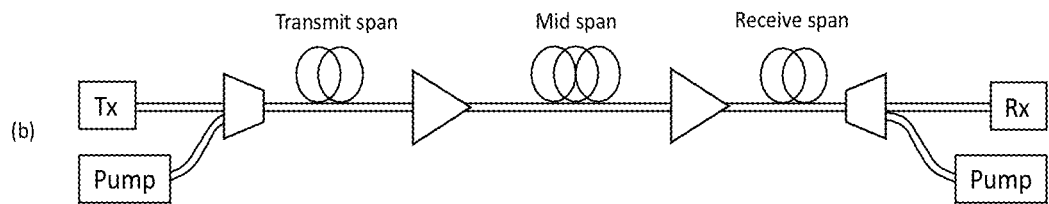
Figure 1C:
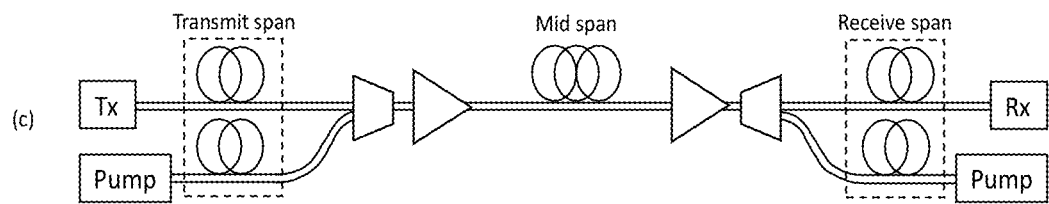
Figure 2:
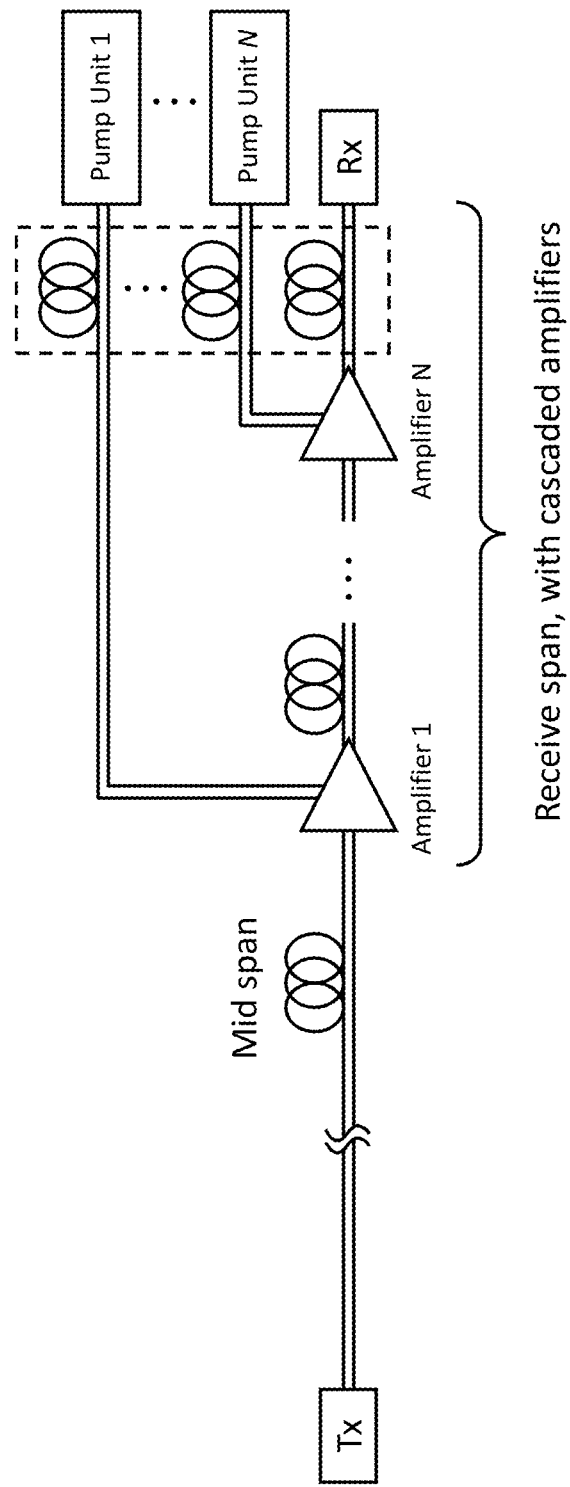
FIG. 2 shows an exemplary unrepeatered system with cascaded amplifiers pumped from the receiver where pumps are delivered to the amplifiers via dedicated fiber cores.

Systems and methods are disclosed for cascading multiple amplifiers in the receive span, whose optical pumps are all supplied by different pump delivery fiber cores. FIG. 2 shows an exemplary unrepeatered system with cascaded amplifiers pumped from the receiver where pumps are delivered to the amplifiers via dedicated fiber cores.

In the exemplary system of FIG. 2, instead of using only a single amplifier pumped from the receiver, cascading multiple amplifiers are used, all pumped from the receiver, with the optical pump(s) for each amplifier being supplied using different dedicated fiber cores. A 'fiber core' here can refer to either different strands of fiber, or different cores of the same multi-core fiber (MCF), or a combination thereof.

Figure 3A:
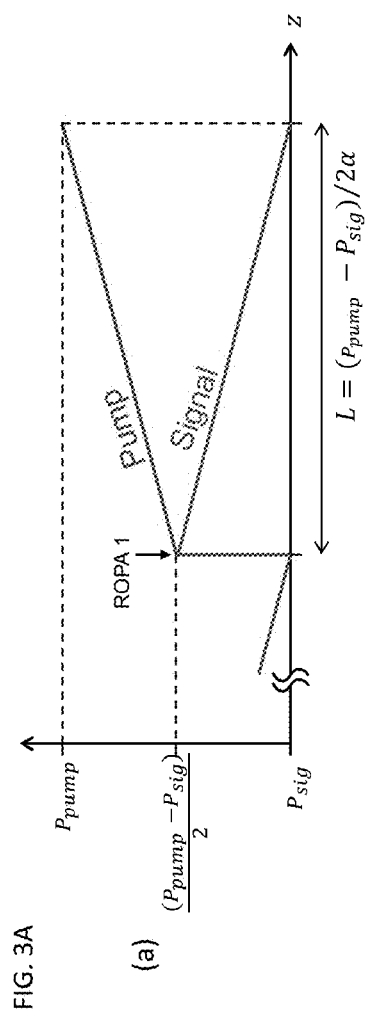
FIGS. 3A-3B show exemplary comparisons of the pump and signal profiles when using (a) one ROPA and (b) multiple ROPAs pumped from the receiver.
Figure 3B:
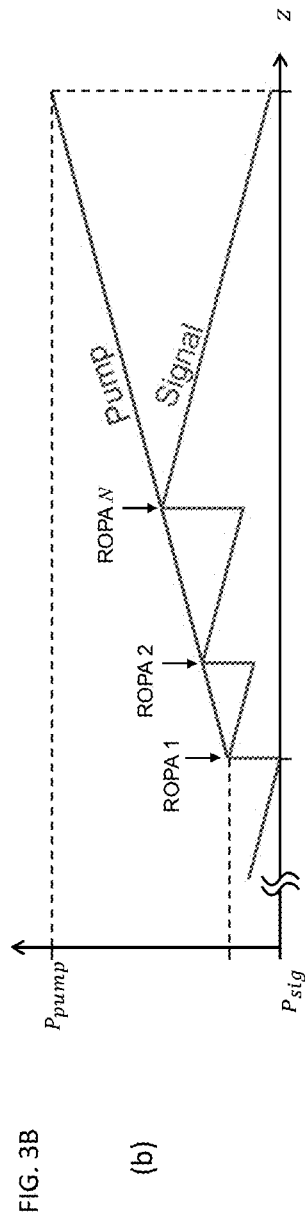

FIGS. 3A-3B show an exemplary comparison of the pump and signal profiles when using (a) one ROPA and (b) multiple ROPAs pumped from the receiver, showing the advantage of using cascaded amplifiers. Consider the case where the amplifiers are ROPAs. The power profiles of the pump and signal in a conventional link employing only a single ROPA pumped from the receiver using a dedicated fiber core is shown in FIG. 3A. For ease of illustration, it is assumed that: (i) the signal and pump have the same rate of attenuation; and (ii) the quantum efficiency of the ROPA is 100% (all of the pump power at the ROPA is transferred to the signal). Let $P_{pump}$ be the launch power of the pump at the receiver, $P_{sig,min}$ be the signal power at the input of the ROPA (as necessary to have sufficient OSNR for signal detection), and $\alpha$ is the fiber's attenuation. The ideal ROPA described can be placed at a maximum distance of $L_{max} = (P_{pump} - P_{sig,min})/2\alpha$ before the receiver, as shown in FIG. 3A. It is possible to increase the distance between the first ROPA and the receiver by using cascaded ROPAs whose pumps are delivered using different dedicated fiber cores as shown in FIG. 3B. We assume the launch power per pump delivery core remain $P_{pump}$ as before. In this configuration, the first ROPA is no longer required to have an output power as high as $(P_{pump}-P_{sig,min})/2$. This reduces the required pump power for that ROPA so it can be placed further back from the receiver. The additional ROPAs are inserted as necessary to ensure that the signal's power never fall too low (i.e., signal power fall below or near $P_{sig,min}$) where significant reduction in OSNR may result. The ultimate achievable distance between the first ideal ROPA and the receiver in the multi-ROPA configuration is $L_{max}=(P_{pump}-P_{sig,min})/\alpha$, which is double that of the single-ROPA configuration.

The aforementioned benefit of using cascaded amplifiers in the receive span also applies for distributed Raman amplification. In this case, the amplifiers in FIG. 2 are WDM pump/signal combiners, with the transmission fiber spans themselves acting as the amplification medium. FIG. 4 shows exemplary pump delivery solutions using (a) different strands of single-mode fibers, (b) different cores of a multi-core fiber.

Figures 4A, 4B:
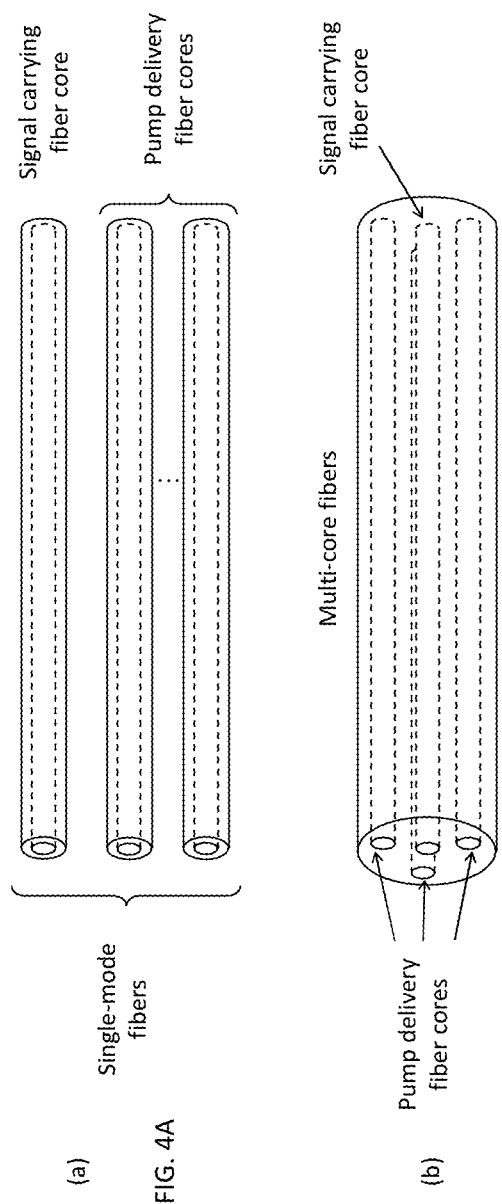
FIGS. 4A-4B show exemplary pump delivery solutions using (a) different strands of single-mode fibers, (b) different cores of a multi-core fiber.

The system uses multiple (>1) cascaded amplifiers pumped from the receiver (as shown in FIG. 2), with the optical pump(s) for each amplifier being supplied by dedicated pump delivery cores. The pump delivery cores may be different strands of single-mode fiber (FIG. 4A), or different cores of a multi-core fiber (FIG. 4B). The signal carrying core is part of a multi-core fiber, with the pump delivery fiber cores mixed with the signal carrying cores inside the multi-core fibers. Alternatively, a plurality of single-mode fibers can be used.

FIG. 5A-5C show exemplary system configurations where each cascaded amplifier is a ROPA, and multiple single-mode fibers are used to deliver the pumps from the receiver. FIG. 5A shows co-propagating pump where the pump is combined with the signal to boost the signal. Correspondingly, FIG. 5B shows a counter-propagating pump, while FIG. 5C shows a dual co- and counter-propagating pump.

Figure 6:
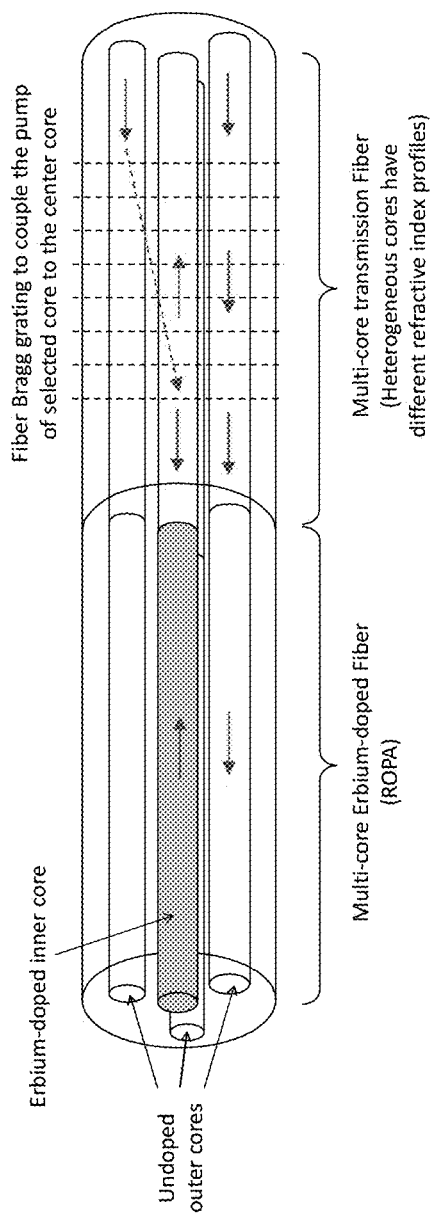
FIG. 6 shows exemplary system configurations where each cascaded amplifier is a ROPA, and a multi-core fiber is used to deliver the pumps from the receiver.

FIG. 6 shows exemplary system configurations where each cascaded amplifier is a ROPA, and a multi-core fiber is used to deliver the pumps from the receiver. The pump travels in a counter-propagating direction relative to the signal.

Figure 7:
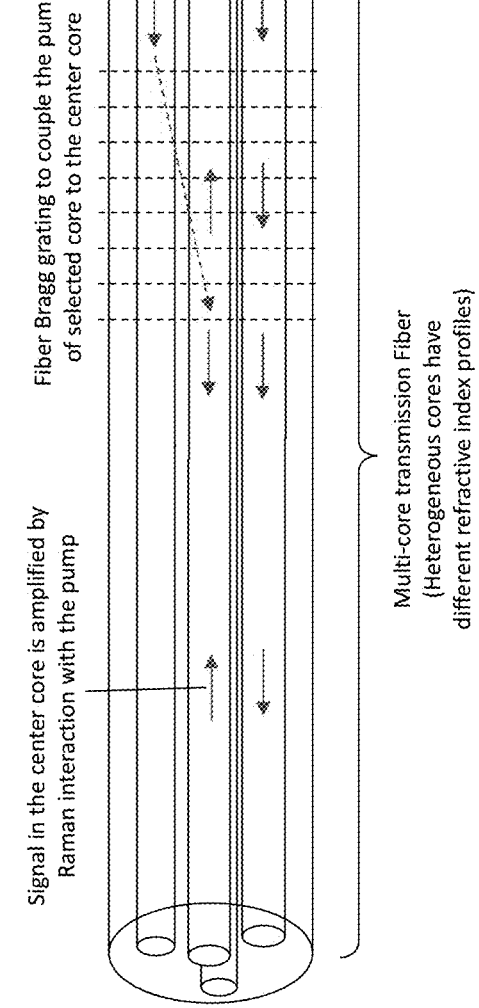
FIG. 7 shows an exemplary system configuration in the case where each cascaded amplifier is a distributed Raman amplifier, and a multi-core fiber is used to deliver the pumps from the receiver.

FIG. 7 shows an exemplary system configuration in the case where each cascaded amplifier is a distributed Raman amplifier, and a multi-core fiber is used to deliver the pumps from the receiver.

In the case where the pump delivery cores are different strands of single-mode fiber and the amplifiers are ROPAs, three different pumping schemes are as shown in FIGS. 5A-5C. In FIG. 5A, the pump travels in a co-propagating direction relative to the signal in the amplifying medium (erbium-doped fiber); in FIG. 5B, the pump travels in a counter-propagating direction relative to the signal in the amplifying medium; and in FIG. 5C, two pumps are used, each traveling in a co- and counter-propagating direction relative to the signal in the amplifying medium. In each of the three cases, wavelength-division multiplexing (WDM) pump/signal combiners based in single-mode fiber are used to couple the pump from the selected fiber to the signal-carrying fiber before the amplifying medium.

In the case where the pump delivery cores are different cores of a multi-core fiber and the amplifiers are ROPAs, we propose using the multi-core erbium-doped fiber shown in FIG. 6 in which only the center core of the multi-core fiber is doped; the outer undoped core(s) allow pump(s) to pass through with low loss without interaction with the signal. Pump(s) from a selected outer core is coupled to the center core by means of a long-period fiber Bragg grating (FBG). To ensure that only light from the selected outer core is coupled, the undoped multi-core fiber has heterogeneous cores where each core has slightly different refractive index profiles, so have different effective indices of propagation ($n_{eff}$) at the pump wavelength. This enables a FBG of the correct pitch spacing be written into the undoped MCF to efficiently couple only the pump(s) of the selected core, leaving the pump(s) of the other cores unaffected—they pass through the outer undoped core(s) of the erbium-doped MCF to the next ROPA.

In the case where the pump delivery cores are different cores of a multi-core fiber and the amplifiers are distributed Raman amplifiers, the proposed fiber configuration is shown in FIG. 7. Similar to the case considered in FIG. 6, the cores of the multi-core fiber used in transmission has heterogeneous cores with different effective indices of propagation ($n_{eff}$) at the pump wavelength. FBGs of the correct pitch spacing written into the MCF allow only the pump(s) on the selected core to couple efficiently into the signal-carrying core, whereby Raman interaction between the pump and signal result in Raman gain for the signal. There are no doped cores in this configuration.

The foregoing use of multiple (>1) cascaded amplifiers increases transmission reach by increasing the length of the back span. A second innovation is the use of different cores of a multi-core fiber to deliver optical pumps to the different ROPAs. When the optical pumps are delivered in this manner, and the multi-core transmission fiber is properly designed with heterogeneous cores wherein each core has slightly different effective index of propagation at the pump wavelength, long-period fiber Bragg gratings with appropriate pitch spacing can be used to couple the pump of a selected core to the signal-carrying core before the multi-core erbium-doped fiber. This avoids the need to use a fan-in fan-out device to spatially demultiplex the signal and pump cores, and also eliminates the need to use WDM pump/signal combiners to couple the pump into the signal core.

As above, in each of the embodiments shown, the present invention has been described with reference to the configuration in which the present invention was carried out with each of the cascaded amplifiers. However, the present invention is not limited to the above described applications. For example, the present invention may also be implemented with a known rearward pumping optical fiber amplifier in which pumping light is entered from the output side of signal light that is fed to an amplification optical fiber.

Furthermore, the present invention is not limited to the optical fiber amplifier of each of the embodiments. The present invention may widely be applied to a variety of configurations including an optical fiber coupler provided to implement optical synthesis and division for a lengthy optical fiber of a different type, such as an optical laser.

While there has been described what is at present considered to be preferred embodiments of this invention, it will be understood that various modifications may be mad therein, and it is intended to cover in the appended claims all such modifications as fall within the true spirit and scope of this invention.

What is claimed is:

1. An unrepeatered transmission system, comprising:
   a receiver coupled to a receive span;
   a transmitter coupled to the receive span; and
   a plurality of cascaded amplifiers in the receive span with dedicated fiber cores to supply one or more optical pumps from the receiver to each amplifier, wherein the plurality of cascaded amplifiers increase system reach by increasing the length of a back span in an unrepeatered link;

wherein the amplifiers are remote optically pumped amplifiers (ROPAs), the amplifying medium is an erbium-doped fiber, and the optical pump consist of one or more wavelengths in the neighborhood of 1480 nm corresponding to the absorption band of erbium-doped fiber; and wherein the dedicated pump delivery cores are different cores of a multi-core fiber.

2. The system of claim 1, wherein the optical pump(s) are coupled into the signal-carrying core of the same multi-core fiber before the amplifying medium using a grating.

3. A method for optical communication, comprising:

using a plurality of cascaded amplifiers in a receive span with dedicated fiber cores to supply one or more optical pumps from a receiver to each amplifier; and increasing the length of a back span with a plurality of cascaded amplifiers in an unrepeatered link;

wherein the amplifiers are remote optically pumped amplifiers (ROPAs), the amplifying medium is an erbium-doped fiber, and the optical pump consist of one or more wavelengths in the neighborhood of 1480 nm corresponding to the absorption band of erbium-doped fiber; and wherein the dedicated pump delivery cores are different cores of a multi-core fiber.

4. The method of claim 3, wherein the optical pump(s) are coupled into the signal-carrying core of the same multi-core fiber before the amplifying medium using a grating.

* * * * *